June 3, 1958 — H. A. LEWIS — 2,837,711

ELECTRICAL CONTROL

Filed Aug. 28, 1952 — 2 Sheets-Sheet 1

INVENTOR,
HAROLD A. LEWIS,
BY Bruninga and Sutherland
ATTORNEYS.

June 3, 1958  H. A. LEWIS  2,837,711
ELECTRICAL CONTROL
Filed Aug. 28, 1952  2 Sheets-Sheet 2

INVENTOR,
HAROLD A. LEWIS,
BY Bruninga and Sutherland,
ATTORNEYS.

United States Patent Office 2,837,711
Patented June 3, 1958

2,837,711

ELECTRICAL CONTROL

Harold A. Lewis, St. Louis, Mo., assignor to Frank Adam Electric Company, St. Louis, Mo., a corporation of Missouri Application August 28, 1952, Serial No. 306,776

4 Claims. (Cl. 323—123)

This invention relates to electronic controls, as for dimming stage lights and the like, and more particularly, to a phase-shifting circuit for controlling the conduction of a gas-filled tube.

In the conventional 180° phase-shifting circuit, a resistor and a variable inductor are connected in series combination across a center-tapped transformer or voltage supply so that a bridge is formed, with the output terminals being at the center tap and at the connection between the resistor and the variable inductor. Where it is desired to provide for approximately a full 180° shift in phase in the output with respect to the input, the inductor must have a wide range of reactance variation, and this may lead to substantial expense, especially in the use of a saturable-reactor type of variable inductor.

United States Patent No. 2,459,551 discloses a phase-shifting circuit that permits the use of low-cost limited-range reactors, but requires the provision of additional electrical elements. The circuit is like the above conventional system, but further includes a second resistor and a fixed inductor forming a series combination across the voltage supply. A tapped resistor is also added between the center tap on the voltage supply and the connection of the second resistor to the fixed inductor. The output terminal at the center tap of the supply is then relocated on this tapped resistor.

Although the above patented system offers the advantage of a wide phase shift with a low-cost variable inductor, it is necessarily more complicated than the so-called conventional system. It is accordingly an object of this invention to provide a comparatively simplified phase-shifting circuit, the performance of which is as good as, if not better than, that described in the aforementioned patent. In particular, the center-tapped voltage supply in both the conventional and above patented systems is eliminated, and the tapped resistor of the above patented system is also eliminated, and without adding any new elements but by changing one of the elements already included. The circuit includes two branch circuits connected across a voltage supply (not necessarily tapped), each having a resistor and an inductor in series combination. One of the inductors is variable and the other is a fixed, tapped inductor. One of the grid circuit connections or output terminals of the bridge is at the connection between the first resistor and the variable inductor (as customary) and the other is at the tap on the fixed inductor. Adjustability of the circuit is achieved by making the respective resistors variable. Adjustment at the resistor associated with the variable inductor affords a means of centering the extreme phase angles of the output relative to the input for a particular range of control, as determined by the maximum and minimum values of impedance of the variable inductor. Variation introduced at the other resistor results in change of the expansion or amount of phase shift for a given range of variation of the variable inductor. The tap on the fixed inductor need not be at center, but may be itself varied to modify the linearity of the relationship between control and output. Although inductors are referred to above, other reactive elements such as capacitors might be employed.

Other features of the invention will be in part apparent from and in part pointed out in the following detail description taken in connection with the accompanying drawings, in which.

Figure 1:
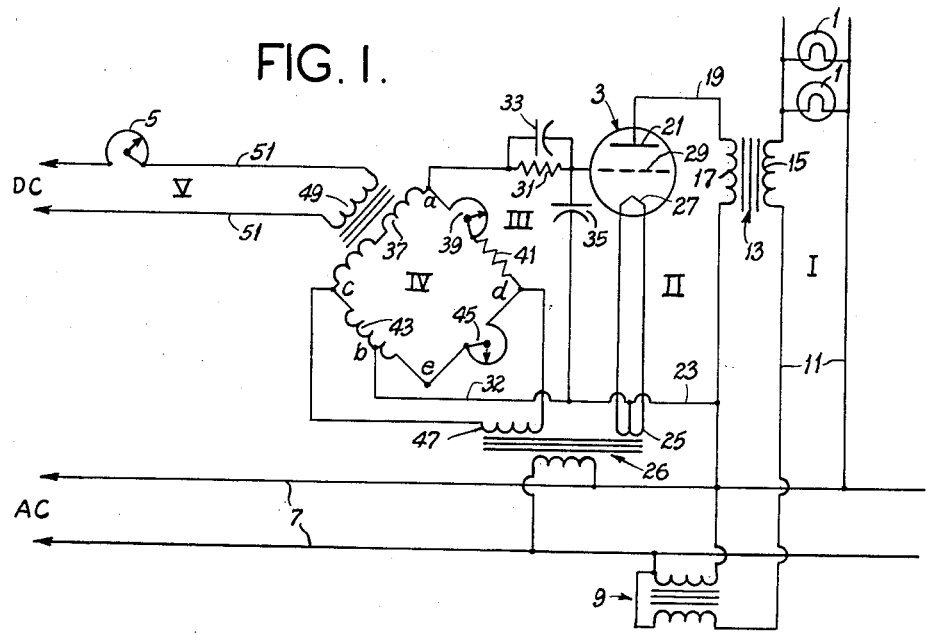
Fig. 1 is a circuit diagram of a complete control embodying the phase-shifting circuit of this invention.

Referring now to Fig. 1 of the drawings, there is shown a system for dimming lamps 1, as in a theatre, although it will be understood the invention has application for various other purposes where it is desired to control a load by varying the conduction of a grid-controlled tube 3. The system embodies a load circuit I which in this instance includes the lamps 1, a main control circuit II including a grid-controlled gas-filled tube 3, a grid circuit III for the tube 3, a phase-shifting bridge IV supplying a variable phase firing signal to the grid circuit, and a remotely located control circuit V including a variable D. C. voltage supply, by means of which the operator controls the lamp illumination.

The load circuit I is supplied from conventional power lines 7 which are connected through a booster transformer 9 to load lines 11. The load voltage is thereby stepped up, as from 120 volts to 132 volts, in order to overcome the minimum voltage drop across a variable impedance device 13 connected in the load circuit. This device 13 may be a transformer having a load-winding 15 series connected with the lamps 1 and a control winding 17 connected in the main control circuit II. The impedance offered by the load winding 15 and, thereby, the power supplied to the lamps, varies as the main control circuit II approaches either an open-circuit or a closed-circuit condition, as determined by the conduction of the tube 3. One terminal of the control winding 17 is connected at 19 to the plate 21 of the control tube 3, and the other terminal is center tapped at 23 to a filament transformer winding 25. The transformer winding 25 may be part of a power supply transformer 26, and is connected to heat the tube filament or cathode 27.

The tube 3 has a control grid 29 which, with the cathode 27, forms a part of the grid circuit III. The grid 29 is connected through a grid current-limiting resistor 31 to an output terminal $a$ of the bridge IV. The other output terminal $b$ of the bridge is connected at 32 to the center tap on the cathode transformer winding 25. Capacitors 33 and 35 are provided across the resistor 31 and across the tube, respectively, to improve the firing characteristics of the tube and generally avoid inadvertent firing.

It will be understood the gas-filled tube 3 operates as a discharge tube conducting on positive half-waves of the plate voltage when a grid signal therefor exceeds the critical grid voltage. Conduction is controlled by advancing or retarding the phase of the grid firing signal relative to the plate voltage. Therefore, in order to obtain a control action, it is necessary to provide a phase-shifting circuit in conjunction with a fixed A. C. supply for the grid signal. It is this phase-shifting circuit to which the invention is particularly directed.

The circuit is in the form of a bridge, with a load winding 37 of a saturable reactor forming one leg thereof. This load winding 37 (which may consist of two magnetically opposed coils) is connected between the output terminal $a$ and an input terminal $c$ of the bridge IV. A first adjustable resistor 39 is connected between output terminal $a$ and the other input terminal $d$. This leg of the bridge may also include a fixed resistor 41. The other side of the bridge is formed by a fixed, tapped inductor 43 connected to the input terminal $c$ and at $e$ to a second adjustable resistor 45. The latter is then connected to the other input terminal $d$. The bridge input terminals $c$ and $d$ are supplied from a secondary 47 of the transformer 26.

It will be noticed the output terminal $b$ of the bridge is made at a tap on the inductor 43. Moreover, the elements 43 and 45 should not be balanced, but should preferably be deliberately selected so that one has an impedance considerably greater than that of the other. In this instance with the tap on the inductor, the reactance of the inductor 43 should be in excess of the resistance of the resistor 45. The control circuit is completed by a D. C. control winding 49 on the saturable reactor, which is connected at 51 to a remotely-located variable D. C. supply through an adjustment rheostat 5.

Figure 2:
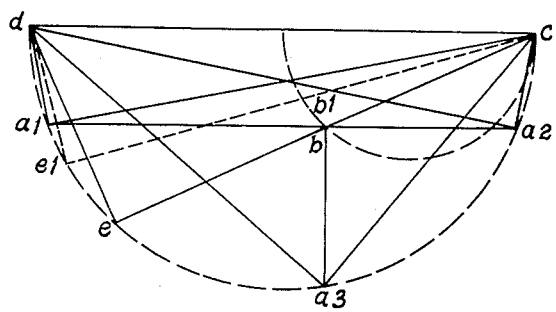
Fig. 2 is a phase relation diagram illustrating certain characteristics of the control shown in Fig. 1.

In operation, the load winding 37 of the saturable reactor provides a varying reactance depending upon the D. C. excitation of the control winding. This excitation is controlled at the variable supply, as by potentiometers (not shown), which may be located remote from the remainder of the control. Referring to Fig. 2, certain voltage relationships are shown diagrammatically. The voltage across the input terminals $c$ and $d$ of Fig. 1 appears as the horizontal line $cd$ in Fig. 2. The voltage drop across the variable inductance 37 appears as the line $ca-1$ or $ca-2$, for maximum and minimum conditions of reactance or inductance, respectively. The voltage drop across the first adjustable resistor 39 and fixed resistor 41 appears as $a-1d$ or $a-2d$. In the instance $a-1$, the voltage drop across the saturable reactor is at a maximum and in the instance $a-2$, a minimum. The voltage $a$ varies with variation in the excitation of control winding 49, so that it may appear at any point on the curved locus between $a-1$ and $a-2$, as for example, at $a-3$.

Similar voltage drops appear across the second adjustable resistor 45 and the fixed tapped inductor 43. As shown in Fig. 2, the voltage drop across the fixed inductance or reactance appears as the line $ce$ and the voltage drop across the resistor 45 appears as the line $ed$. The output terminal $b$ on the inductor 43 is correspondingly shown as a point $b$ on the center of the line $ce$ in Fig. 2. Consequently, the lines $ba-1$, $ba-2$ and $ba-3$ indicate the phase variation in the output $ab$ with respect to the input $cd$. It will be apparent that the output is variable over a range of 180°, and the particular phase depends upon the relationship of the reactance at the main winding 37 of the saturable reactor to the resistance at 39 and 41. The reactance at 37 is under the control of the variable supply, hence the voltage phase at the output terminals may be readily shifted and the conduction of the tube 3 increased or decreased merely by adjustment of the supply. In this way, the lamp illumination is remotely controlled.

Fig. 2 also illustrates the effect occurring upon changes at the adjustable resistor 45. When this resistance is decreased, a new relationship of voltages $ce$ and $ed$ is established. The point $e$ is re-established as indicated by the dotted lines meeting at $e-1$, and the tap $b$ assumes a new position as indicated at $b-1$. In this sense, the second adjustable resistor 45 provides a method of varying the spread or amount of phase shift at the bridge IV for a given range of variation at the saturable reactor. In the condition wherein the output appears at $b-1$, the spread is something less than 180°.

Figure 3:
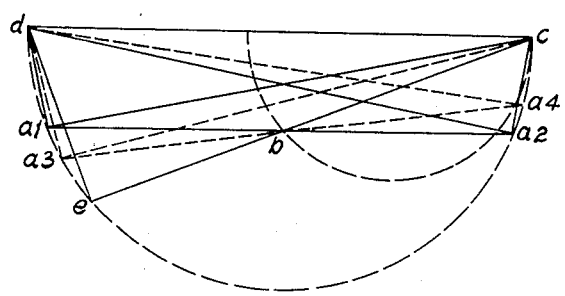
Fig. 3 is a phase relation diagram similar to Fig. 2 illustrating other characteristics of the invention.

Fig. 2 illustrates conditions wherein the tap $b$ is a center tap on the inductor 43. Fig. 3 illustrates an alternative arrangement wherein the tap $b$ is not on center but is offset therefrom. Such may be desirable in order to minimize the variation in the amplitude of the output voltage $(ab)$ occurring with the phase shift. It should be pointed out, however, that this variation in amplitude is not too important in its effect upon the firing of the control tube 3, because the output of the bridge is not a true sinusoidal wave but rather has a sharply peaked shape introduced through the saturable reactor. If desired, the tap $b$ may be made variable in order to obtain a further control action. Such a variable tap would have the effect of modifying the linearity of the output phase as a function of the control adjustment.

Fig. 3 also illustrates a "tilting" effect occurring upon adjustment of the first adjustable resistor 39. Voltages $a-1$ and $a-2$ of Fig. 3 are equivalent to the corresponding voltages of Fig. 2 indicating one adjustment of the resistor 39 for the predetermined maximum and minimum values of reactance at the reactor winding 37. In Fig. 3, an alternative condition resulting upon different adjustment of the resistor 39 is shown at $a-3$ and $a-4$. In the latter instance, the resistance at 39 has been increased, thereby providing new minimum and maximum values of relative impedance at the reactor windings 37 as compared with the resistance of 39. In some applications, it may be desirable to have such a "tilting" introduced into the control in order to unbalance the controlling action. For example, a customer may wish to spread the greater portion of the adjustment at the variable supply over the low range of illumination. In other applications, however, the desired effect might be a straight line or balanced relationship between adjustment and illumination at the lamps 1. In any event, this control may be set up to provide various response characteristics to adjustment.

It will be understood that although a tapped inductor is shown at 43 in Fig. 1, similar operation could be obtained by the use of a tapped capacitor arrangement substituted for the resistor 45, the resistor 45 then being substituted for the inductor 43.

Figure 4:
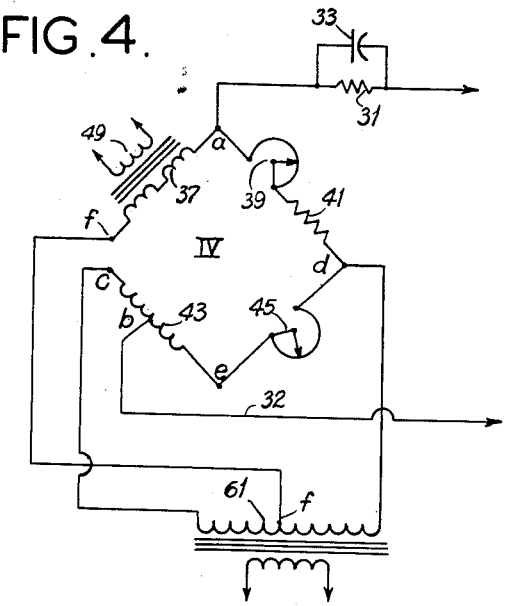
Fig. 4 is a circuit diagram illustrating an alternative embodiment of the bridge arrangement of Fig. 1.

Other variations in the control will occur to those skilled in the art. For example, as shown in Fig. 4, a tapped secondary transformer 61 may be substituted for the secondary winding 47 of Fig. 1. In this instance, the bridge IV is modified so that the full voltage output of the secondary 61 is connected across the second resistor 45 and the tapped inductor 43. The main windings 37 of the saturable reactor, however, are not connected as indicated at Fig. 1 but are connected by the output terminal $a$ and an input terminal $f$ which is tapped to the secondary 61.

Figure 5:
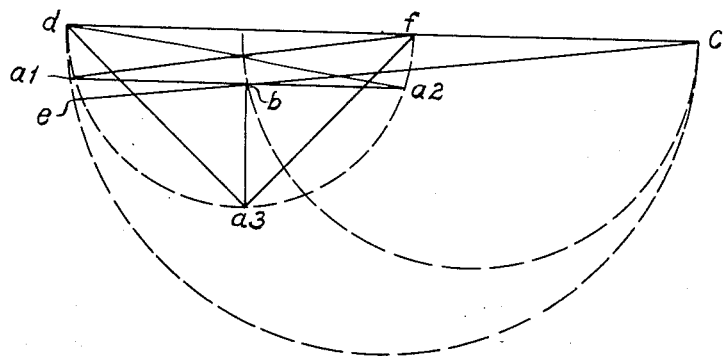
Fig. 5 is a phase relation diagram similar to that of Fig. 2 but illustrating phase relations for the Fig. 4 embodiment.

In this latter condition, the locus of the voltage shown at the tap on the inductor 43 assumes a wider curvature relative to the voltage at $a$, as shown in Fig. 5. The larger arc or locus permits a straighter and also greater drop of the reference point $b$ relative to that shown in Figs. 2 and 3.

From the foregoing description, it is apparent that those skilled in the art will understand the structure, function and mode of operation of the invention herein disclosed, and appreciate the advantages thereof. Although several embodiments have been disclosed in detail, it is to be understood that the invention is not limited thereto, but the drawings and description thereof are to be understood as being merely illustrative. It is realized that many modifications and variations will present themselves to those skilled in the art without departing from the spirit of this invention or the scope thereof as set forth in the appended claims.

Having thus described the invention, what is claimed and desired to be secured by Letters Patent is:

1. A phase-shifting circuit for supplying an A. C. output, the phase of which is variable with respect to the input, the circuit comprising a first resistor and a variable reactance series connected across said input, a second resistor and a tapped reactance series connected across said input, and output terminals one being at the connection between the first resistor and the variable reactance and the other being at the tap on the tapped reactance, said second resistor having substantially more resistance than reactance, and said tapped reactance having substantially more reactance than resistance.

2. A phase-shifting circuit as set forth in claim 1 wherein one of said resistors is variable.

3. A phase-shifting circuit as set forth in claim 2 wherein the other resistor is also variable.

4. A phase-shifting circuit as set forth in claim 1 wherein said tapped reactance has a variable tap.

References Cited in the file of this patent

UNITED STATES PATENTS

| | | |
|---|---|---|
| 1,911,051 | Bedford | May 23, 1933 |
| 2,393,884 | Callender | Jan. 29, 1946 |
| 2,420,399 | New | May 13, 1947 |
| 2,521,880 | Storm | Sept. 12, 1950 |
| 2,537,767 | Langenwalter | Jan. 9, 1951 |